G. D. ROSE.
METHOD OF MAKING WASHERS FOR JOINTS.
APPLICATION FILED JULY 18, 1916.
1,267,805.
Patented May 28, 1918.
2 SHEETS—SHEET 1.
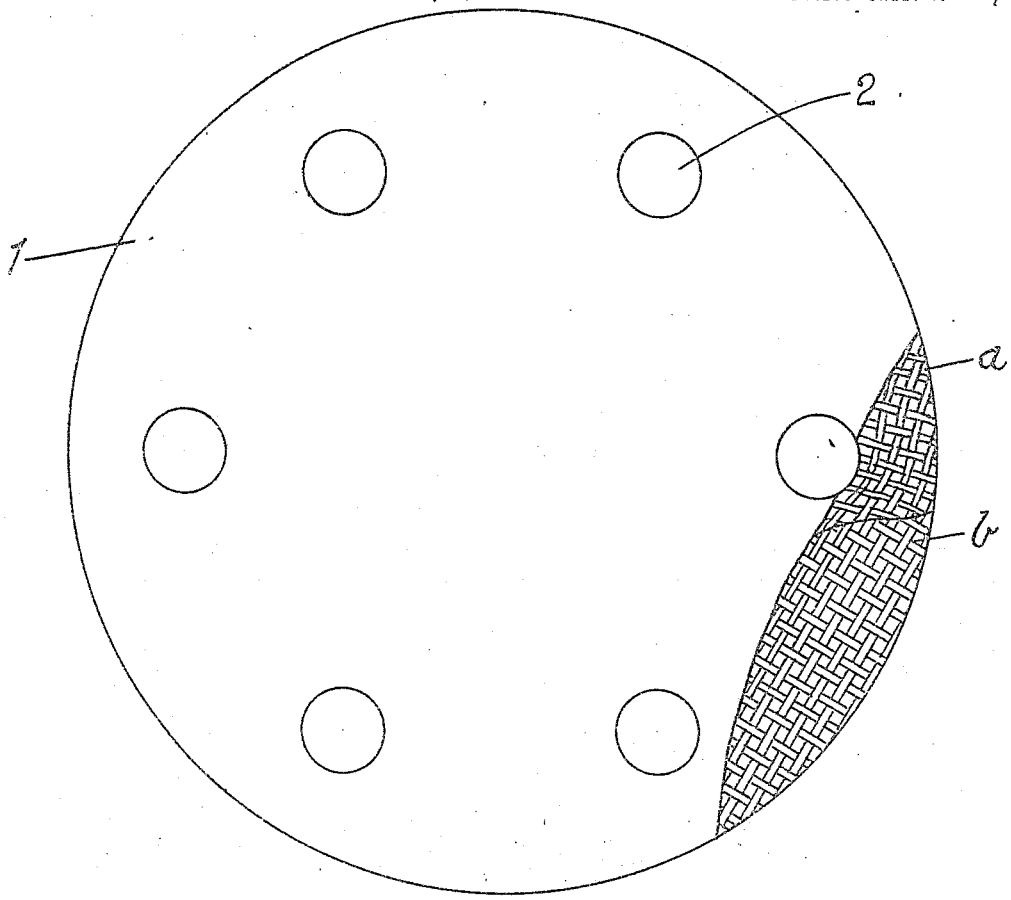
Inventor
George Daubney Rose
By Wm Wallace White
Attorney G. D. ROSE.
METHOD OF MAKING WASHERS FOR JOINTS.
APPLICATION FILED JULY 18, 1916.
1,267,805.
Patented May 28, 1918.
2 SHEETS—SHEET 2.
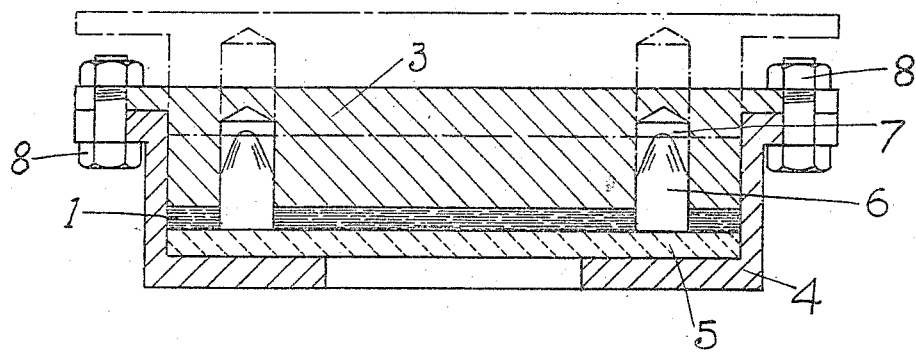
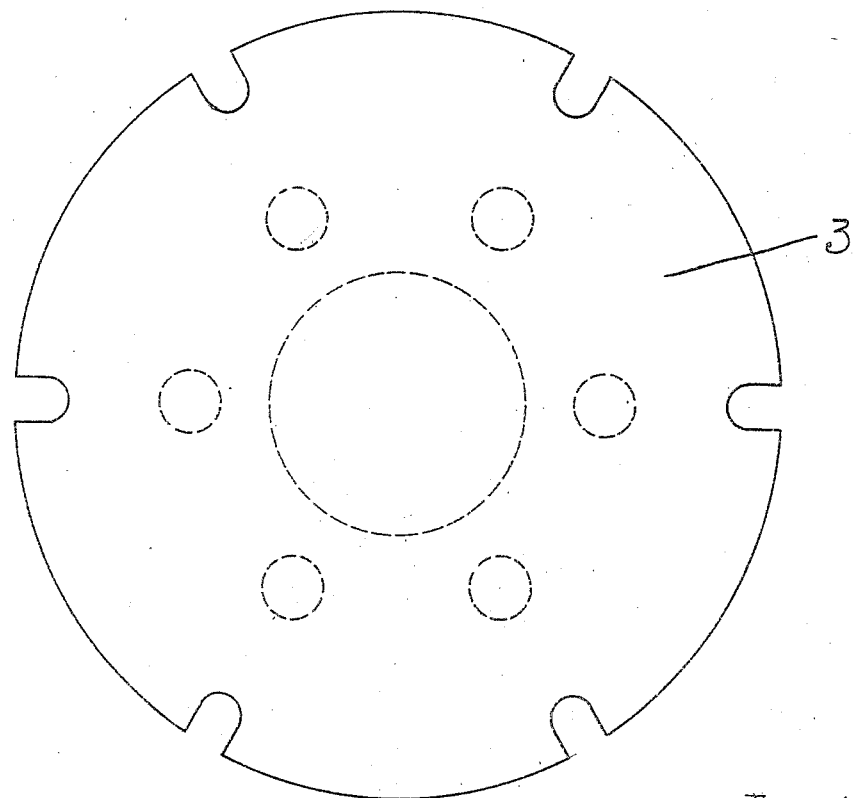
Inventor
George Daubney Rose
By Wm Wallace White
Attorney.

UNITED STATES PATENT OFFICE.

GEORGE DAUBNEY ROSE, OF SALFORD, MANCHESTER, ENGLAND.

METHOD OF MAKING WASHERS FOR JOINTS.

1,267,805.  Specification of Letters Patent.  Patented May 28, 1918.

Application filed July 18, 1916. Serial No. 109,962.

*To all whom it may concern:*

Be it known that I, GEORGE DAUBNEY ROSE, a subject of the King of Great Britain, residing at 14 Albert Park road, Lower Broughton, Salford, Manchester, in the county of Lancaster, England, have invented new and useful Improvements in Methods of Making Washers for Joints, of which the following is a specification.

This invention relates to improvements in the manufacture of disks or washers for joints for steam and for other purposes, and consists essentially in the manufacture of such disks or washers from two or more layers of coir fabric each impregnated with rubber, balata or other suitable adhesive material and in addition, if desired, with thin layers or sheets of rubber or the like interposed, the combined layers being then subjected to pressure in a mold and subsequently vulcanized by the application of heat.

In the accompanying two sheets of drawings—

Figure 1 is a plan, partly sectional, of a complete disk or washer made according to my invention.

Fig. 2 is a cross section of the same.

Fig. 3 is a transverse vertical section, on a smaller scale, of a suitable form of mold, and Fig. 4 is a plan of the mold with the bolts removed.

In the example illustrated the disk or washer consists (as clearly shown in Fig. 2) of five layers or thicknesses of woven coir fabric preferably having the weft threads *a* of one layer running transversely over the warp threads *b* of the next layer (see Fig. 1) substantially in the manner described in the specification to British Letters Patent No. 2139 of 1914. As already stated each layer of coir fabric is impregnated or coated with rubber, balata or other suitable adhesive material and in addition if desired thin layers of sheet rubber or equivalent substance can be interposed between the layers of coir fabric. The combined layers are then placed in a suitable mold 4 and subjected to the required pressure by means of hydraulic or other power and subsequently vulcanized by the application of heat in the usual way.

The complete disk or washer 1, as shown in Figs. 1 and 2, is provided, in this instance, with six holes 2 and these holes are formed in the molding process without cutting or breaking the warp or weft of the coir fabric by employing a plate 5 fitting in the bottom of the mold 4 and provided in this case with six conical pegs 6 fixed perpendicularly on the plate. As the superimposed layers of woven coir fabric are pressed downward into the mold 4 by the action of hydraulic or other power applied to the cap or cover 3 of the mold, the conical pegs 6 penetrate the layers opening and displacing the warp and weft of the coir fabric and making the required series of holes 2 without cutting or breaking the coir yarns and when the cap or cover 3 has been forced down upon the mold the ends of the pegs 6 project into corresponding holes or recesses 7 formed to receive them in the cap or cover 3. The cap or cover 3 is then secured to the mold 4 by bolts 8 and the mold subjected to the necessary heat for vulcanizing the disk or washer.

It will be obvious that the disk or washer may be either round as shown or of any other desired shape and that it may be either left solid or formed with any number of holes from one upward and that such hole or holes may be in any required position.

What I claim as my invention and desire to secure by Letters Patent is:—

1. The herein described method of making washers from fabric which consists in forming openings in the fabric by pushing aside the threads of the fabric and then securing them in this position.

2. The herein described method of making washers from fabric which consists in impregnating the fabric with a rubber solution, forming openings in the fabric by pushing aside the threads of the fabric and then vulcanizing the rubber while the threads of the fabric are pushed aside.

In testimony whereof I have signed my name to this specification in the presence of two subscribing witnesses.

GEORGE DAUBNEY ROSE.

Witnesses:
S. W. GILLETT,
HERBERT ROWLAND ABBEY.